United States Patent

Davis et al.

[15] 3,707,027
[45] Dec. 26, 1972

[54] LOADING SLEEVE FOR INSTALLING A PISTON AND RING ASSEMBLY INTO A CYLINDER BORE

[72] Inventors: Lewis M. Davis; Frank G. Warrick, both of Muskegon, Mich.

[73] Assignee: Sealed Power Corporation, Muskegon, Mich.

[22] Filed: Nov. 12, 1970

[21] Appl. No.: 88,703

[52] U.S. Cl. ................................................ 29/222
[51] Int. Cl. ............................................. B23p 19/04
[58] Field of Search........29/222, 229, 269, 235, 224, 29/282

[56] References Cited

UNITED STATES PATENTS 1,745,374  2/1930  Leutwyler ............................. 29/222
3,541,664  11/1970  Fogg ...................................... 29/222

FOREIGN PATENTS OR APPLICATIONS 201,824  11/1907  Germany ............................... 29/222

Primary Examiner—Andrew R. Juhasz
Assistant Examiner—J. C. Peters
Attorney—Barnes, Kisselle, Raisch & Choate

[57] ABSTRACT

A loading sleeve for installing a piston equipped with radially compressible piston rings into a cylinder bore of an engine block. The sleeve is a generally cylindrical body open at its axially opposite ends and its tapered internally to squeeze the rings from their free state diameter down to bore diameter as the piston moves axially through the sleeve. The sleeve is adapted to mount on the marginal surface of the engine block surrounding the cylinder bore and has a necked down configuration forming an entrance lip for piloting the sleeve and thus the piston contained therein into the combustion chamber end of the cylinder bore. An all-plastic embodiment as well as a composite metal and plastic embodiment of the sleeve is disclosed.

10 Claims, 13 Drawing Figures

PATENTED DEC 26 1972　　　　　　　　　　　　　3,707,027

INVENTORS
LEWIS M. DAVIS
FRANK G. WARRICK
BY
Barnes, Kisselle,
Raisch & Choate
ATTORNEYS

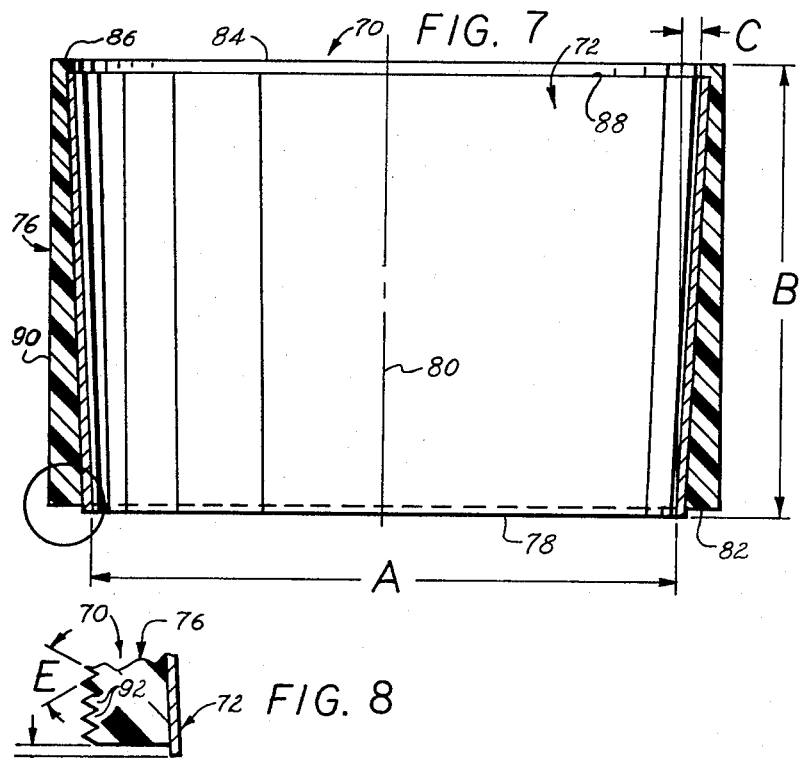
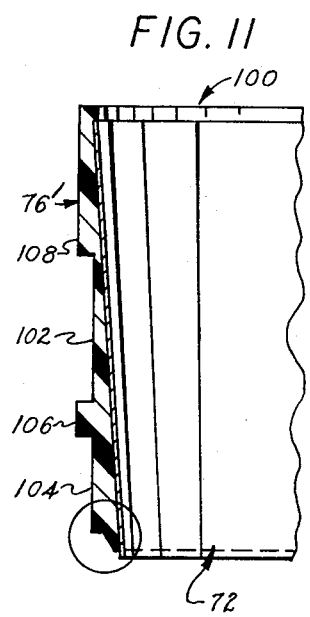
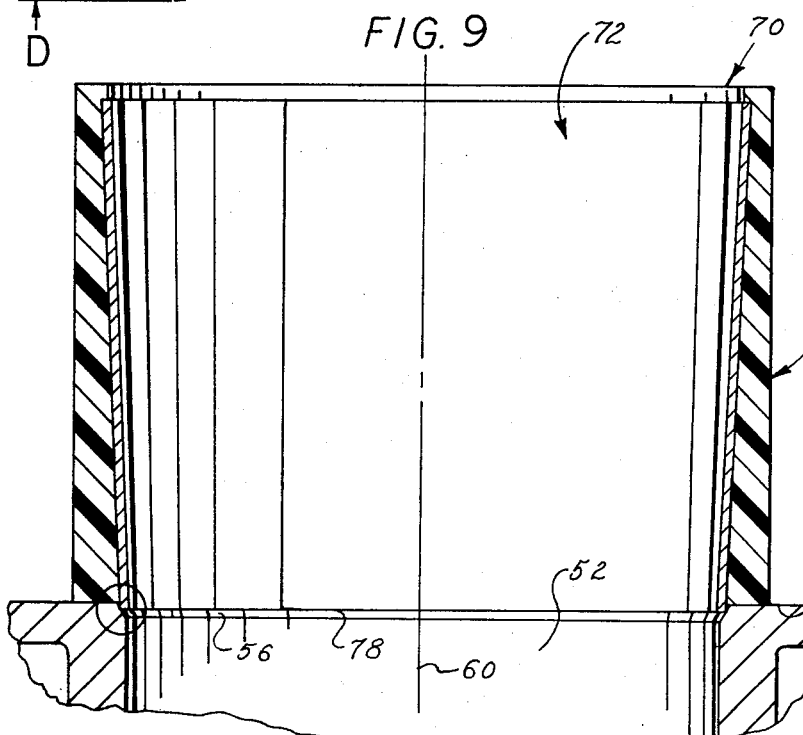
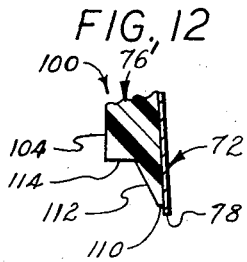
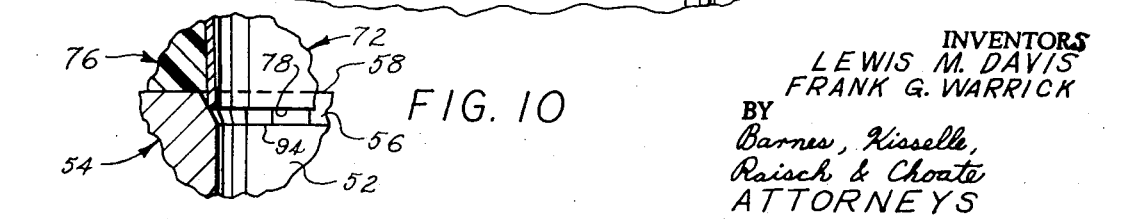

LOADING SLEEVE FOR INSTALLING A PISTON AND RING ASSEMBLY INTO A CYLINDER BORE

This invention relates to a loading sleeve adapted to facilitate the insertion of a piston equipped with radially compressible piston rings into a cylinder bore of an engine block or the like.

It has been customary in the assembly of internal combustion piston engines to use various types of loading sleeves which are capable of circumferentially embracing the piston rings carried on the piston so as to squeeze them down to or slightly less than bore diameter so that the piston can be inserted axially end-wise into the cylinder bore. In both original assembly and repair operations, this has been a relatively costly manual operation requiring care and dexterity.

One type of prior art loading sleeve used for factory installation is a heavy steel cylinder having a tapered inner periphery which at its large or entrance end is adapted to freely receive the piston with the rings at their free state diameter and thus protruding beyond the circumference of the piston. The inner periphery of the sleeve tapers down to approximately bore diameter so that, in response to the piston being moved axially through the sleeve, the rings slide along the tapered inner periphery and are compressed to approximately bore diameter by the time they are about to enter the bore. The exit end of the sleeve is squared off to seat flat on the flat marginal surface of the engine block surrounding the entrance end of the cylinder bore. The sleeve is thus registered with the bore by using the thrust faces of the piston skirt as a pilot in the cylinder bore.

However, the above prior art sleeve has not been capable of reliably loading pistons with independently acting rail oil rings due to the existence of a chamfer at the end of the bore which forms a "pop-out" space beyond the exit end of the sleeve and the junction of this chamfer with the cylinder bore in which the compressed rails of the piston oil control ring assembly can unduly expand as the piston is being moved from the sleeve into the bore. This problem is particularly acute in original equipment manufacture where assembly line timing requires fast and reliable installation despite the fact that the cylinder bore chamfer usually varies from bore to bore in a multi-cylinder engine as well as from engine to engine so that the chamfer on one bore may be concentric and the chamfer of the next bore may be eccentric. Hence, the dimension of any given chamfer measured at a given location along its surface in a radial plane extending through the axis of the bore may vary from almost zero to at least three thirty-seconds inch in cylinder bore with a diameter of about 4 inches.

Because of these conditions, it has been found that the rails of oil control rings of the dual rail type, particularly those having rails independently biased outwardly such as that disclosed in U.S. Pat. No. 3,477,732, can expand in the chamfer area to such an extent that they will pop out of the ring groove of the piston and/or jam between the outer periphery of the piston and the chamfer. This in turn may damage the oil ring assembly and/or the cylinder bore as well as cause costly delays in the piston installation processes.

Accordingly, an object of the present invention is to provide an improved loading sleeve which is capable of guiding the piston rings on the piston into the bore so as to overcome the aforementioned ring jamming and/or pop-out problems.

Another object of the invention is to provide an improved loading sleeve of the above character which is light in weight and thus easy to handle, which has a prolonged life even when subjected to being dropped or roughly handled, which combines toughness and flexibility to minimize damage to the engine bore and/or piston and rings during use and which is quieter in use.

Other objects as well as features and advantages of the present invention will become apparent from the following detailed description taken in conjunction with the accompanying drawings in which:

FIG. 7 is a vertical center section taken along the axis of a second embodiment of a loading sleeve also constructed in accordance with the present invention.

FIG. 8 is an enlarged fragmentary sectional view of the portion of the sleeve circled in FIG. 7.

FIG. 9 is a vertical center section taken along the axis of the sleeve and an associated cylinder bore illustrating the manner in which the sleeve of FIG. 7 is registered with and piloted in the entrance end of the cylinder bore.

FIG. 10 is an enlarged fragmentary sectional view of the circled portion of FIG. 9.

FIG. 11 is a fragmentary vertical section taken along the axis of a third embodiment of a loading sleeve constructed in accordance with the present invention.

FIG. 12 is an enlarged fragmentary sectional view of the circled portion of FIG. 11.

FIG. 13 is an enlarged fragmentary sectional view corresponding to FIG. 12 but showing a further modification of the sleeve.

Figure 1:
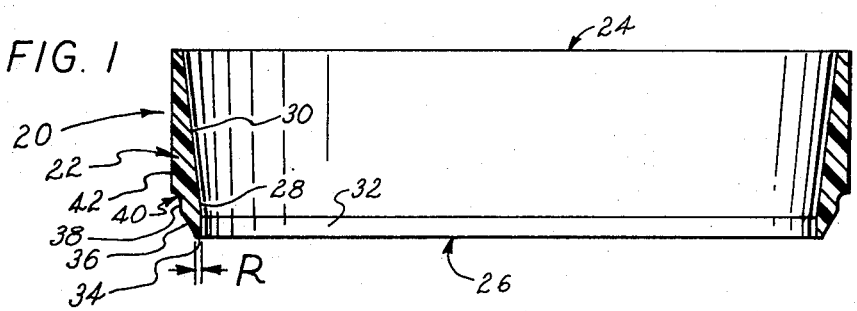
FIG. 1 is a vertical center section taken along the axis of the one embodiment of a loading sleeve constructed in accordance with the present invention.
Figure 2:
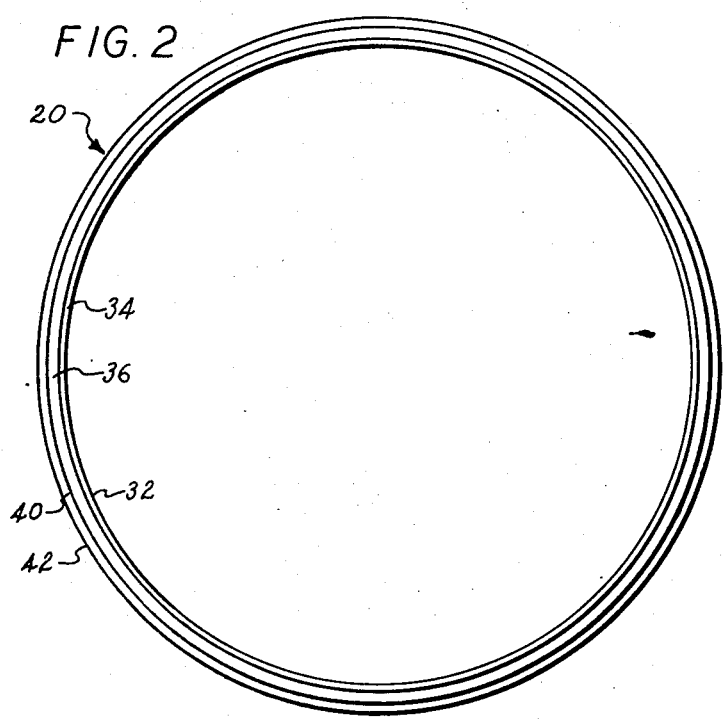
FIG. 2 is a bottom plan view of the loading sleeve shown in FIG. 1.

Referring in more detail to the accompanying drawings, FIGS. 1 and 2 illustrate one embodiment of a loading sleeve 20 constructed pursuant to the present invention for installing a piston equipped with a set of piston rings into the bore of a cylinder. Sleeve 20 is a one-piece, all-plastic member preferably injection molded from a relatively rigid and impact resistant plastic material, such as an acrylonitrile-butadiene-styrene material sold under the trademark CYCOLAC by the Marbon Division of Borg-Warner Corporation, or equivalent material. When so constructed, sleeve 20 is a light-weight, inexpensive and fairly durable part which is sufficiently inexpensive to be packaged as a "throw-away" item along with a set of piston rings as they are sold in the replacement market. Sleeve 20, therefore, need not be able to withstand repeated use over a prolonged period as is the case in engine manufacturing operations.

As best seen in FIG. 1, sleeve 20 comprises a generally cylindrical body 22 open at its axially opposite entrance and exit ends 24 and 26 respectively.

The inner periphery 28 of body 22 is generally frusto-conical in contour to define a tapering surface 30 which extends from upper end 24 and converges toward a junction with a relatively short cylindrical surface 32 which in turn extends from surface 30 down to the lower end 26 of body 22. Surface 30 has a predetermined diameter at entrance end 24 sized for a given cylinder bore dimension so as to freely receive the piston rings as the same are carried on a piston in their radially expanded free state condition. Surface 32 has a predetermined diameter less than end 24 so that the rings are radially compressed to an outside diameter substantially equal to or less than that of the cylinder bore nominal diameter as their outer peripheries slide along surface 30 when the piston is moved axially into end 24, through body 22 and out exit end 26 into the cylinder bore 52, as explained in more detail in conjunction with FIGS. 3, 4, 5 and 6. Surfaces 30 and 32 are made smooth and free from parting lines, voids, etc., to provide a slippery sliding surface and thus reduce the drag on the piston to a minimum.

In accordance with a principal feature of the present invention, exit end 26 of body 22 is provided with means for piloting sleeve 20 a short distance into the combustion chamber end of the cylinder bore. This structure in sleeve 20 consists of the necked-down lip configuration in the outer surface of the body 22 in the vicinity of end 26. This configuration in detail consists of a narrow flat surface 34 extending in a plane perpendicular to the axis of sleeve 22 having a radial dimension R in the range of about 0.010 inch to 0.030 inch, a frusto-conical surface 36 extending axially from surface 34 toward entrance end 24 and diverging outwardly in this direction at an angle of about 30° with respect to the axis of sleeve 20. Surface 36 terminates at its upper end an axial distance of about 0.150 inch from surface 34 at a junction with a cylindrical surface 38 having a predetermined diameter about 0.217 inch greater than the nominal diameter of the cylinder bore with which sleeve 20 is adapted to be used. Surface 38 extends approximately 0.150 inch axially and terminates in a radius 40 which forms a shoulder at the junction with the main outer cylindrical periphery 42 of body 22. The outside diameter of surface 42 is preferably about 0.153 inch greater in diameter than surface 38.

The foregoing dimensions are given by way of illustration and not by way of limitation; likewise, in a sleeve 20 constructed as described above, the following diametrical dimensions have been found to provide a proper relationship to insure proper seating and piloting of sleeve 20 in the combustion chamber end of a cylinder bore of engines having nominal bore diameters ranging from 3.750 inches to 4.180 inches:

| "A" +.005 – .003 | "B" Ref. | "C" ±.010 | "D" Min. |
| --- | --- | --- | --- |
| 3.750 | 3.967 | 4.000 | 4.120 |
| 3.875 | 4.092 | 4.125 | 4.245 |
| 3.910 | 4.127 | 4.160 | 4.280 |
| 4.000 | 4.217 | 4.250 | 4.370 |
| 4.050 | 4.267 | 4.300 | 4.420 |
| 4.062 | 4.279 | 4.312 | 4.432 |
| 4.094 | 4.311 | 4.344 | 4.464 |
| 4.130 | 4.347 | 4.380 | 4.500 |
| 4.187 | 4.404 | 4.437 | 4.557 |
| 4.250 | 4.467 | 4.500 | 4.620 |
| 4.300 | 4.517 | 4.550 | 4.670 |
| 4.320 | 4.537 | 4.570 | 4.690 |
| 4.340 | 4.557 | 4.590 | 4.710 |
| 4.360 | 4.577 | 4.610 | 4.730 |

Dimension "A" in the table above represents the nominal diameter of the engine cylinder bore with which sleeve 20 is to be used; dimension "B" represents the outside diameter of surface 38; dimension "C" represents the inside diameter of surface 30 at entrance end 24; and, dimension "D" represents the outside diameter of surface 42. The axial length of sleeve 20 may be in the order of 1.250 inches when used with automotive pistons of the type illustrated in FIGS. 3 and 4, wherein a conventional piston 44 is shown equipped with the usual set of three piston rings consisting of a top compression ring 46, a middle compression ring 48 and an oil control ring 50 of the dual rail type, preferably such as that disclosed in the aforementioned U.S. Pat. No. 3,477,732.

Figure 5:
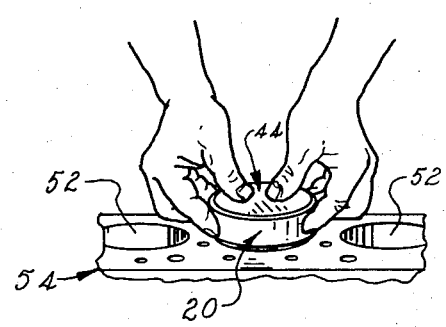
Figure 6:
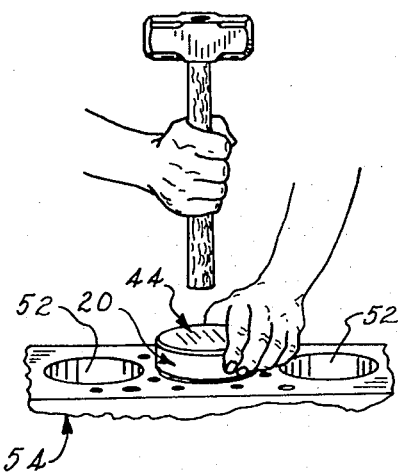

To install a piston 44 equipped with rings 46, 48 and 50 assembled thereon in an unconfined manner (i.e., so that they are expanded to their free state diameter in their respective grooves) into a bore 52 of an engine block 54 as illustrated in FIGS. 5 and 6, the following procedure is preferably employed.

Figure 3:
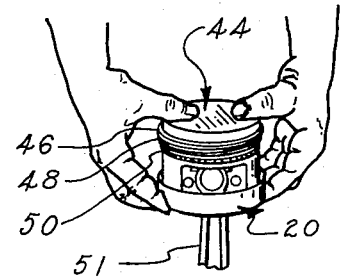
FIGS. 3, 4, 5 and 6 are fragmentary perspective views illustrating the manner in which the loading sleeve of FIGS. 1 and 2 is used in conjunction with a piston and ring assembly to compress the rings to bore diameter while a piston is being inserted into a cylinder bore of an engine.
Figure 4:
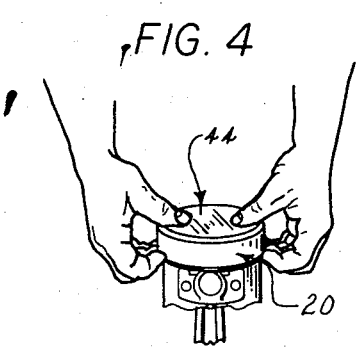

First, rings 46, 48 and 50 are installed in their respective grooves on piston 44 and care is taken to make sure that the rings are free in their grooves. Then, lubricant is sprayed over the piston and rings. The piston subassembly, consisting of piston 44, rings 46, 48 and 50, connecting rod 51 and the associated wrist pin, is inserted rod first through the large end 24 of loading sleeve 20 until the piston skirt is started in the sleeve as shown in FIG. 3. After the rings have been centered on the piston, loading sleeve 20 is slid axially upwardly relative to piston 44 until the upper end 24 of the sleeve is about flush with the upper end of piston 44 as shown in FIG. 4. At this point, sleeve 20 will be substantially coextensive with the ring belt portion of the piston and all three of the rings 46, 48 and 50 will be in sliding engagement with the surface 30 of the sleeve 20.

It is to be understood that as each ring enters the large end 24 of sleeve 20, it will have a clearance with the "C" dimension of sleeve 20 (as defined previously) for ease of entry of the ring into the open end of the sleeve. Shortly after a given ring has travelled axially down into the sleeve, or the sleeve has moved upwardly relative to the piston, the ring will slidably engage surface 30. As the ring moves further along surface 30, it will be compressed or contracted until it reaches surface 32, whereupon the ring will be at the "A" dimension of the sleeve, which corresponds to a diameter within a range of approximately 0.003 inch less than bore diameter to 0.005 inch greater than bore diameter.

After sleeve 20 and the piston subassembly has been arranged as shown in FIG. 4, it is lowered endwise until the piston skirt and rod have entered cylinder bore, then piston 44 is pressed down as shown in FIG. 5 until the loading sleeve 20 rests upon block 54. As will be understood best by reference to FIGS. 9 and 10, which illustrate the similar relationship of a modified sleeve 70 relative to the upper end of the cylinder bore, the above sequence will cause the necked-down lip at the exit end of sleeve 20 to engage a chamfer 56 which is customarily formed at the upper end of the cylinder bore 52. Chamfer 56 provides an angled conical transition between bore 52 and the flat surface 58 of block 54 which is perpendicular to the axis 60 of the bore and which defines a marginal surface around the entrance to the combustion chamber end of bore 52. Chamfer 56 is made customarily at an angle of about 30° to axis 60, and for a four-inch bore it usually will be approximately three sixty-fourths inch measured in a radial plane through the axis of the bore. However, due to the aforementioned variations in the concentricity of chamfer 56 relative to bore 60, this dimension may vary from zero to three thirty-seconds inch. Due to the lip configuration of end 26 of sleeve 20, the sleeve will enter a short distance below the plane of surface 58 and sleeve surface 36 will slidably engage chamfer 56. Thus, in response to the downward pressure exerted as shown in FIG. 5, sleeve 20 will contract slightly and shift laterally until it centers itself on the axis of bore 60, assuming chamfer 56 is concentric therewith. If the chamfer is eccentric, the lip of sleeve 20 will tend to split the difference in eccentricity and also will project below the edge of the chamfer at the point where it has minimum dimension.

With surface 36 of sleeve 20 thus seated firmly upon the chamfer of bore 52, and the sleeve held firmly with one hand as shown in FIG. 6, piston 44 is struck with a hammer handle or other suitable tool and thereby thrust downwardly in one fast motion to thereby drive the piston assembly the remainder of the way through sleeve 20 and completely into bore 52. During this insertion motion, each of the rings 46, 48 and 50 moves axially past exit end 26 of sleeve 20, whereupon it will expand because of its resilience, and/or because of the spring expander associated with it, into sliding contact with the cylindrical surface of bore 52. The fast loading motion of the piston insures that the ring will move past the short annular space formed by the portion of chamfer 56 which is exposed below end 26 of sleeve 20 (see FIG. 10) before the ring has had a chance to expand out to bore diameter. However, even if this procedure is done slowly but smoothly, the radial expansion zone is sufficiently limited by the lip of sleeve 20 so that the ring does not expand to a diameter sufficient to jam the piston ring and piston assembly on the chamfer. Also, the ring will still be retained within its groove and hence cannot pop out of the groove. Due to the momentum generated by the insertion motion, the angle of the chamfer then can be relied upon to recompress the ring the slight amount necessary to bring it back to bore diameter while the piston is moving axially downwardly into the bore.

From the foregoing description, it now will be apparent that sleeve 20 overcomes the aforementioned ring pop-out and/or jamming problems during installation of the piston in the cylinder bore in a very simple and economical manner. In addition, sleeve 20 is much lighter in weight due to being made primarily of plastic material and thus is easy to handle on the assembly line and is not prone to be damaged if accidentally dropped during use. Sleeve 20 is very quiet in operation because the customary scraping and squealing noise of the rings is reduced due to the plastic material of the sleeve. This material also imparts toughness and flexibility to the sleeve while greatly reducing the possibility of damage or injury to the rings, piston and/or cylinder bore during high-speed assembly line operation.

Referring to FIGS. 7–10 inclusive, a modified loading sleeve 70 of the present invention is shown as preferably modified for prolonged repetitive use such as is experienced in connection with assembly line installation of pistons in engines by engine manufacturers or rebuilders. Sleeve 70 is a two-piece composite metal and plastic body made up of a metal liner 72 and an outer plastic shell 76.

One method of construction of sleeve 70 is to turn the outer plastic shell 76 on a lathe from a cylindrical polyurethane casting. Liner 72 is made from a sheet of a tough, wear-resistant metal, preferably full, hard austenitic stainless steel having a strip thickness of approximately .020 to .030 inch. The stainless steel sheet is cut to a pattern of proper form and then the blank is rough-coiled around a mandrel having an outside configuration complemental to the finished inside frusto-conical configuration of liner 72 as shown in FIG. 7. The rough-coiled sheet metal blank is then grit blasted to further coil it to final shape on the mandrel and also to give it a roughened surface on its outer periphery. The liner then is removed from the mandrel and a coating of a suitable adhesive, preferably a polyurethane or epoxy glue, is applied to the inner surface of shell 76 and/or to the outer surface of liner 72 and the liner inserted into the shell to its assembled position as shown in FIG. 7, wherein the narrow exit end 78 of liner 72 protrudes from the exit end of the shell. As the liner is inserted narrow end first into the large end of the shell, the side edges of the liner are forced into abutment. The bottom or exit end of the sleeve 70 then is finished on a lathe so that exit end 78 of liner 72 is smooth and accurate and lies in a plane perpendicular to the axis 80 of the sleeve and protrudes a distance D as shown in FIG. 8 beyond the flat surface 82 of shell 76 an amount in the range of about 0.030 inch to about 0.100 inch.

Also, it is to be understood that loading sleeve 70 can be manufactured on a mass-production basis by forming the steel liner 72 from a one-piece seamless tube in a tapered expansion mandrel-type stamping press, and then placing the conical liner in a suitable mold cavity and casting the plastic shell 76 or 76' around liner 72.

Preferably, the taper angle C shown in FIG. 7 of liner 72 is approximately in the range of 2.5° to 4.5°. The overall axial dimension B of sleeve 76 as shown in FIG. 7 is approximately 3 to 4 inches. Dimension A shown in FIG. 7 (the inside diameter of liner 72 at its exit end 78) preferably is from 0.003 inch under to 0.005 inch over nominal cylinder bore diameter. The upper end 84 of shell 76 is provided with a circumferential lip 86 which overlies the upper large end edge 88 of liner 72 to assist in locking liner 72 against axial movement within shell 76. The average radial thickness of shell 76 is many times that of liner 72 in order to provide reinforcement against the expansion stresses exerted on liner 72 by the piston rings as they are slid axially therethrough during the previously described piston loading process. In addition, as best seen in FIG. 8, the outer periphery 90 of shell 76 may be provided with a series of ridges and valleys in the form of circular lands 92 having a tooth angle E of, for example, 60° to 90° in order to facilitate manual gripping of sleeve 70.

Sleeve 70 is used in a manner similar to sleeve 20 as described previously. As best seen in FIGS. 9 and 10, sleeve 70 is seated on the block in accordance with the procedure described previously in conjunction with FIGS. 4 and 5. When so seated, the flat end surface 82 of shell 76 seats squarely on the marginal surface 58 of block 54 and the protruding end 78 of liner 72 projects below surface 58 into engagement with chamfer 56 of cylinder bore 52. Hence, the transition zone between edge 78 and the junction 94 of chamfer 56 with bore 52 is reduced to minimum and hence there no longer is sufficient radial expansion space for a ring to expand enough to pop out of its groove as the ring travels past the lower end 78 of liner 72 on its way into bore 52.

Referring to FIG. 11, a further modification of a composite metal and plastic sleeve 100 of the invention is illustrated which is made in a manner similar to sleeve 70, metal liner 72 thereof being identical to that of sleeve 70. The outer plastic shell 76' of sleeve 100 is the same as shell 76 except for the exterior configuration thereof. The outer periphery of shell 76' is turned down at 102 and 104 to provide a narrow land 106 and a wider land 108 which further facilitates manually gripping sleeve 100. Each of the lands 106 and 108 may be provided with smaller grooves or lands 92 of the type shown in FIG. 8. In addition, the lower end of shell 76' is necked-down as best seen in FIG. 12 to provide an entrance lip generally corresponding to that provided on sleeve 20. Thus, the lower end of shell 76 has a narrow circular flat surface 110 (beyond which the bore end 78 of liner 72 protrudes), a frusto-conical surface 112 which extends upwardly from surface 110 and diverges outwardly at an angle of about 30° from the axis of sleeve 100. Surface 110 terminates at a radial surface 114 which extends out to the outer cylindrical periphery 104 of shell 76'. Preferably, surface 114 is spaced axially about three-sixteenths inch from the end 78 of liner 72.

As shown in FIG. 13, the lip end of sleeve 100' may be modified slightly so that the surface 110' is flush with lower end 78 of liner 72. This will provide a surrounding surface of plastic to engage chamfer 56 to thereby reduce nicking of chamfer 56 and the end edge 78 of liner 72.

From the foregoing description, it now will be apparent that a loading sleeve constructed in accordance with the present invention is lightweight, easy to handle, and greatly facilitates installing high pressure piston rings in bores with either concentric or eccentric chamfers. Because of its design, the loading sleeve of the invention minimizes the force necessary to push or pull the piston and ring combination through the sleeve into the bore.

We claim:

1. A loading sleeve for installing a piston equipped with radially compressible piston rings into a cylinder bore, said sleeve comprising an annular body open at axially opposite entrance and exit ends thereof, said entrance end being adapted to slidably receive the rod end of a piston axially therein and said exit end being adapted for partial insertion axially into the piston-receiving end of the cylinder bore, said body comprising a coaxial assembly of a metal inner liner and a plastic outer shell, said liner comprising a frustoconical sheet metal member having a radial thickness substantially less than that of said shell and having a generally frusto-conical inner surface extending between its axially opposite ends and tapering to a lesser diameter toward said exit end of said body, means securing said liner in intimate contact within and to said shell throughout at least the major portion of the length of said liner, said liner having a wide end adjacent said entrance end of said body with said liner inner surface dimensioned to receive at said wide end the piston with its rings expanded to their free-state diameter, said liner having a narrow end extending axially at least flush with the exit end of said shell and disposed to project into the piston-receiving end of the cylinder bore a given short distance when said exit end of said body is in seated engagement with the marginal surface surrounding the piston-receiving end of the cylinder bore, said liner inner surface converging radially inwardly so as to compress the rings to an outside diameter substantially equal to or less than that of the cylinder bore at said narrow end as the rings slide at their outer peripheries along said inner surface in response to the piston being moved axially into said entrance end, through said body and out of said exit end of said body, said exit end of said body having lip means for piloting said sleeve a short distance into the combustion chamber end of the cylinder bore, said lip means including an annular marginal portion of said plastic shell at the exit end of said body extending radially outwardly of said narrow end of said liner a distance substantially greater than the radial thickness of said liner to thereby help protect said narrow end of said liner against deformation occasioned by impact of said sleeve exit end first against a surface when said sleeve is oriented at impact with its axis oblique to such surface.

2. A loading sleeve as defined in claim 1 wherein said liner protrudes a short distance axially beyond said shell at said exit end of said body.

3. A loading sleeve as defined in claim 2 wherein said liner is made of full hard austenitic stainless steel and said shell is made of an elastomeric urethane material.

4. A loading sleeve as defined in claim 3 wherein said liner is secured to said shell by an adhesive.

5. A loading sleeve as defined in claim 4 wherein said liner has a straight taper angle in the range of approximately 2½° to 4½° with the minimum inside diameter of said liner being adjacent said exit end of said body and in the order of from 0.003 inch less than to about 0.005 inch greater than the nominal inside diameter of the cylinder bore.

6. A loading sleeve as set forth in claim 1 wherein said lip means includes a frustoconical outer surface of said shell extending axially from said exit end toward said entrance end and diverging outwardly toward said entrance end, said frustoconical outer surface being adapted to pilot into a chamfer at the piston-receiving end of the cylinder bore, and wherein said lip means further includes a shoulder means on the outer periphery of said shell between said frustoconical outer surface and said entrance end having an outside diameter greater than the chamfer of the cylinder bore and located so as to limit to a given distance by engagement of said shoulder means with the marginal surface surrounding the chamfer insertion of said sleeve into the cylinder bore.

7. A loading sleeve as set forth in claim 1 wherein said lip means comprises a portion of said plastic shell adapted to fit into a chamfer at the piston-receiving end of the cylinder bore, said lip means having an outside configuration adapted to complementally engage the chamfer to limit axial insertion of said exit end of said body and to position the exit end of said liner at a point located axially between the junction of the chamfer with a cylinder bore and the junction of the chamfer with a flat marginal surface surrounding the chamfer and normal to the cylinder bore axis.

8. A loading sleeve as set forth in claim 1 wherein said lip means comprises a flat axial end surface of said shell extending radially outwardly of said narrow end of said liner and an axial protrusion extending a slight distance axially beyond said shell end surface.

9. A loading sleeve as set forth in claim 8 wherein said axial protrusion consists solely of the terminal end portion of said narrow end of said liner.

10. A loading sleeve as set forth in claim 8 wherein said axial protrusion comprises the terminal portion of said narrow end of said liner and a terminal portion of said shell surrounding said liner terminal portion and having an outer surface converging toward the exit end of said body.

* * * * *